United States Patent
Steerman

(12) 
(10) Patent No.: US 7,036,749 B1
(45) Date of Patent: May 2, 2006

(54) WASHER NOZZLE WITH INTEGRATED ADJUSTABLE AIM FLUIDIC INSERT (CHIP) AND METHOD

(75) Inventor: Daniel E. Steerman, Harper's Ferry, WV (US)

(73) Assignee: Bowles Fluidics Corporation, Columbia, MD (US)

( * ) Notice: Subject to any disclaimer, the term of this patent is extended or adjusted under 35 U.S.C. 154(b) by 451 days.

(21) Appl. No.: 10/200,595

(22) Filed: Jul. 23, 2002

Related U.S. Application Data

(60) Provisional application No. 60/307,362, filed on Jul. 25, 2001.

(51) Int. Cl.
  *B05B 1/10* (2006.01)
  *B05B 1/24* (2006.01)
  *B60S 1/46* (2006.01)

(52) U.S. Cl. .............................. 239/284.1; 239/284.2; 239/130

(58) Field of Classification Search .............. 239/130, 239/133, 284.1, 587.1, 587.5, 587.6, 284.2
See application file for complete search history.

(56) References Cited

U.S. PATENT DOCUMENTS

| | | | | |
|---|---|---|---|---|
| 3,739,983 A | * | 6/1973 | Jousson | 239/101 |
| 5,269,464 A | * | 12/1993 | Epple et al. | 239/130 |
| 5,749,525 A | | 5/1998 | Stouffer | 239/284.1 |
| 5,762,271 A | * | 6/1998 | Lind et al. | 239/284.2 |
| 5,957,385 A | * | 9/1999 | Suhring et al. | 239/284.1 |
| 6,062,491 A | * | 5/2000 | Hahn et al. | 239/284.2 |
| 6,189,808 B1 | * | 2/2001 | Daniels et al. | 239/284.2 |

* cited by examiner

*Primary Examiner*—Davis Hwu
(74) *Attorney, Agent, or Firm*—Jim Zegeer

(57) ABSTRACT

The invention comprises a curved fluidic device and a housing piece with a curved slot to accommodate the curved fluidic device. The aim angle can be varied greatly by changing the depth of insertion of the fluidic device into the curved slot. By adjusting the curvature of the fluidic device and slot, the amount of variation possible and sensitivity to insertion depth can be controlled. With more curvature, the aim angle can be adjusted more but is more sensitive to insertion depth tolerance. With less curvature, the insertion depth is more robust but the aim adjustment range is smaller.

15 Claims, 6 Drawing Sheets

WASHER NOZZLE WITH INTEGRATED ADJUSTABLE AIM FLUIDIC INSERT (CHIP) AND METHOD

REFERENCES TO RELATED APPLICATIONS

This application is the subject of provisional application Ser. No. 60/307,362, filed Jul. 25, 2001 and entitled, "FLUIDIC NOZZLES WITH ADJUSTABLE AIM" and claims the benefit thereof.

BACKGROUND AND BRIEF DESCRIPTION OF THE INVENTION

The present invention relates to washer system and method in which the washer nozzle aim angle is adjustable.

One of the challenges experienced by all washer nozzle manufactures is delivering the fluid to the correct (vertical) position on the surface to be cleaned. Many things besides the pre-aiming of the nozzle at the manufacturing site can contribute to variation: movement of internal components by handling, installation and misuse/abuse in field. Poor (vertical) delivery of the fluid is also caused by a variation due to manufacturing tolerances in angle and location of the mounting surface and target surface.

Specifying very tight tolerances and tuning of tooling during vehicle launch generally handle this for most types of nozzle. Both of these approaches are expensive, and tuning during launch is extremely disruptive from an inventory and manufacturing management perspective.

A common approach utilizes an expensive ball B and socket S design (FIG. 1) that can be adjusted and readjusted without waste of components or assembly. The major drawback is that fluidics are not easily incorporated because of size limitations and the nozzle can end up misaimed due to unintentional movement of the ball or through improper aiming at the manufacturing site or in the field, resulting in a condition where the washer-wiper system may fail to meet Federal Motor Vehicle Safety Standards (FMVSS) requirements.

Other design attempts have been made to create a housing that can be adjusted or aimed by camming action (FIG. 2). However, this is also expensive and even more susceptible to misaiming at installation, in the field, and/or by normal impacts and vibration during use.

The most robust method currently in use is to have a fixed aim in the nozzle body housing H and insert I (see FIG. 3). Adjustments to aim are made through tooling changes to housing H and/or insert I. While this insures meeting FMVSS by preventing misaiming and movement in the field, it is an expensive and time-consuming process, especially at vehicle launch, to be modifying or building new injection-molding tooling.

Fluidic oscillators have been used for numerous fluid distribution/dispersion applications, including windshield washer and rear window washers on automobiles, and headlamps, and mops. Typically such nozzles have been constructed of two pieces, one flat piece containing the fluidic circuitry and the other piece with a flat slot, accommodating the insert, providing the sealing and primary aim. Sometimes nozzles also incorporate a pad for mounting surface seal and/or a check valve.

The Present Invention

At times there is a need to provide some adjustment to the aim angle of the spray after components are designed and tooled. The object of the present invention is to provide such a washer system and method of manufacturing nozzles capable of aim adjustment. The invention comprises a curved fluidic device and a housing piece with a curved slot to accommodate the curved fluid device. The aim can be varied greatly by changing the depth of insertion of the fluidic device into the curved slot. By adjusting the curvature of the fluidic device and slot, the amount of variation possible and sensitivity to insertion depth can be controlled. With more curvature, the aim can be adjusted more but is more sensitive to insertion depth tolerance. With less curvature, the insertion depth is more robust but the aim adjustment range is smaller.

Thus, the invention provides a washer system in which a washer nozzle housing has a slot for receiving a nozzle insert for projecting a jet of wash fluid upon a surface from a relatively fixed position, wherein the housing slot is longer than the nozzle insert and is curved and the fluidic insert is correspondingly curved, whereby the depth of insertion of the nozzle insert into the housing slot can be varied to vary the angle of impingement of the wash fluid on said surface. In a preferred embodiment, the nozzle insert is a fluid nozzle insert. In another preferred embodiment, the fluidic insert is a fluidic oscillator in which the jet of wash fluid is swept in a given fan angle.

The invention also encompasses the method of adjusting the aim angle of a washer system in which a washer nozzle housing has a slot for receiving a nozzle insert for projecting a jet of wash fluid upon a surface from a relatively fixed position, comprising forming the housing slot in a curved configuration that is longer than the nozzle insert and correspondingly curving the fluidic inserts, whereby the depth of insertion of the nozzle insert into the housing slot is variable to vary the aim angle and point of impingement of the wash fluid on a surface. As noted earlier, by adjusting the slot curvature, the amount of variation and sensitivity to insertion depth can be controlled.

Invention Advantages

Allows for aim adjustment after the components are tooled without additional cost.

Allows for one design to be utilized for many applications providing commonality and economy of scale.

Prevents adjustment or movement in the field while retaining flexibility at manufacturing site to adjust aim.

Provides pre-aim that is more robust against manufacturing variation, thermal effects, vibration and impact during use than typical round ball and round socket because of curved versus round geometry. Round interface has uniform stress across entire engagement surface and is therefore easily moved. Curved interface with limited engagement length has high stress interference areas at leading and trailing edge of circuit preventing movement.

DESCRIPTION OF THE DRAWINGS

The above and other objects of advantages and features of the invention will become more apparent when considered with the following specification and accompanying drawings wherein.

DETAILED DESCRIPTION OF THE INVENTION

Figure 1A:
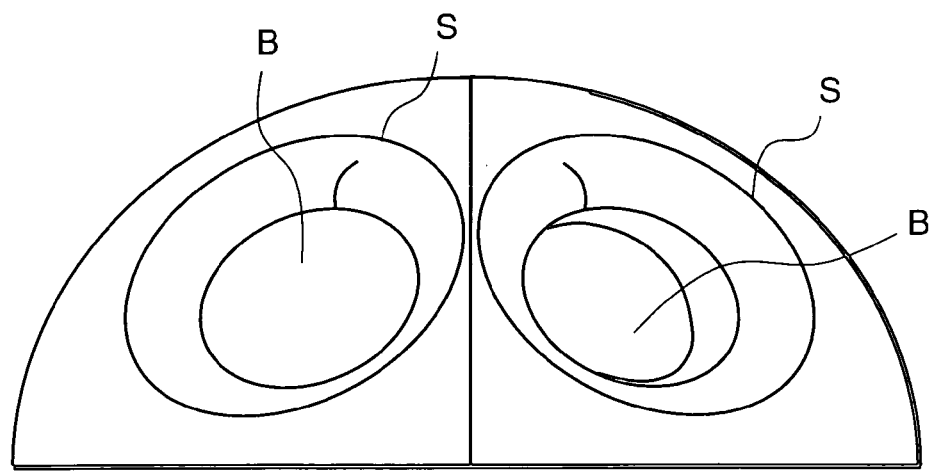
FIG. 1a and FIG. 1b are front and side elevational views respectively of a ball and socket design.
Figure 1B:
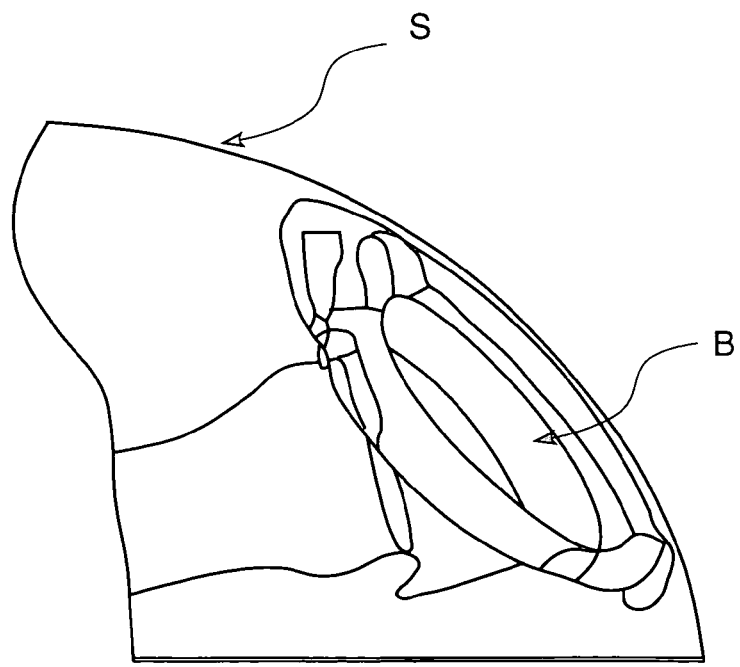
Figure 2:
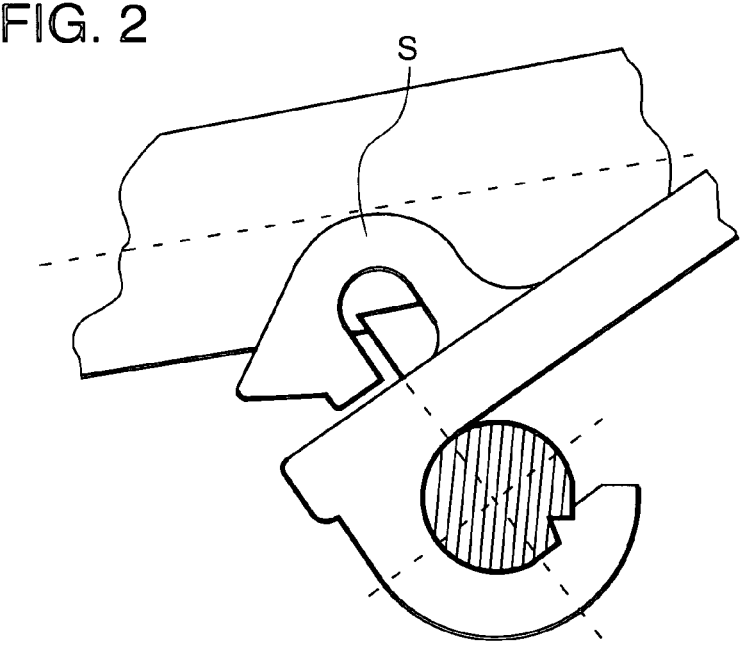
FIG. 2 is a side elevational view of a nozzle housing assembly that can be adjusted by camming action.
Figure 3:
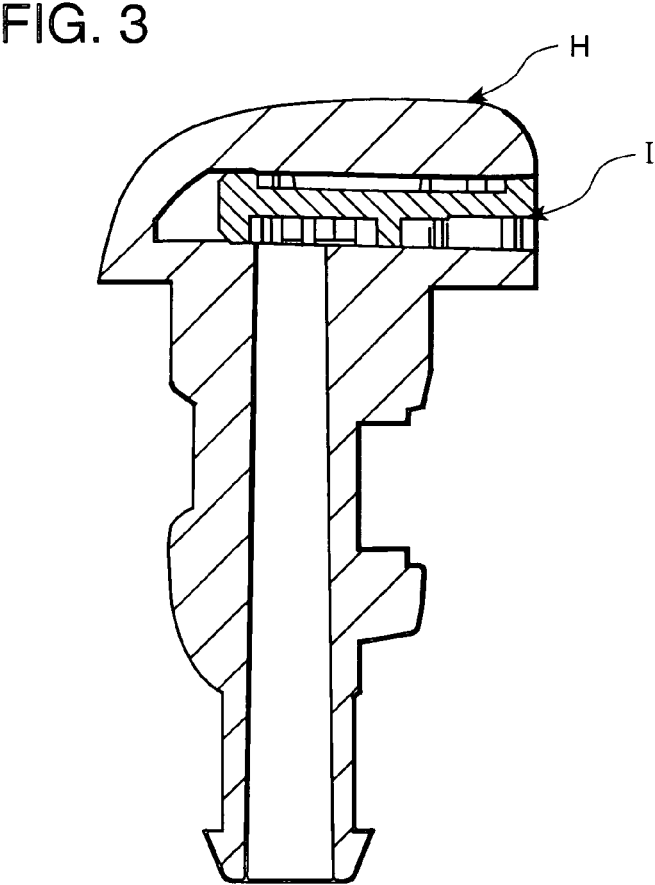
FIG. 3 is a side sectional view of a conventional fluidic oscillator constructed in two pieces, one flat piece containing a fluidic circuit and a housing member having a flat slot for receiving the fluidic insert and receiving primary aiming.
Figure 4A:
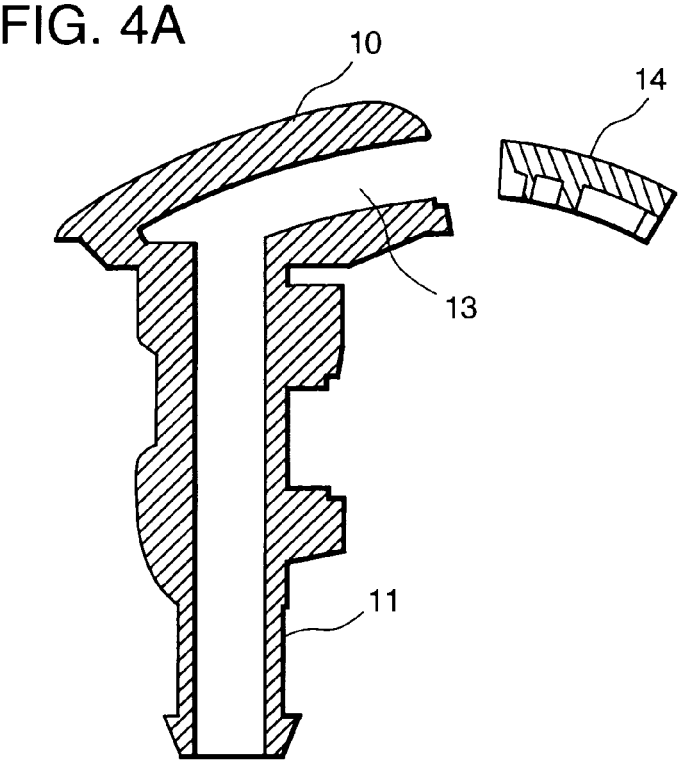
FIG. 4A is a side sectional view of a washer nozzle incorporating the invention.
Figure 4B:
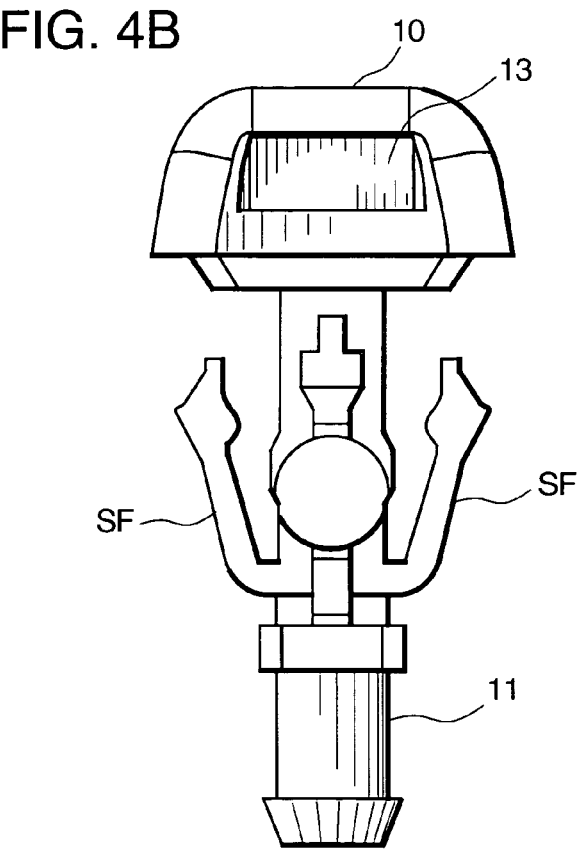
FIG. 4B is a front elevational view without the insert.
Figure 4C:
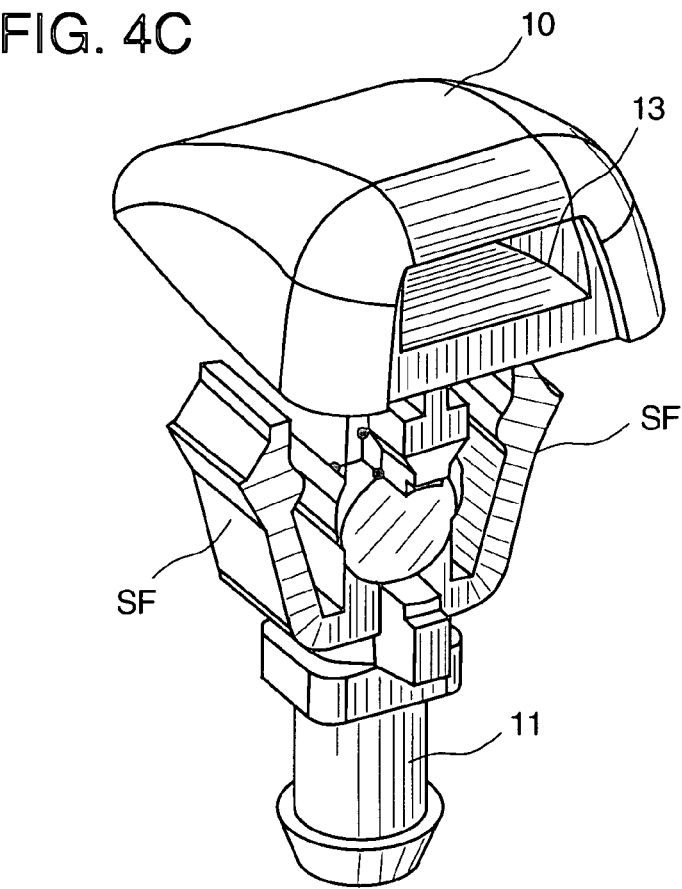
FIG. 4C is a perspective view thereof.
Figure 5:
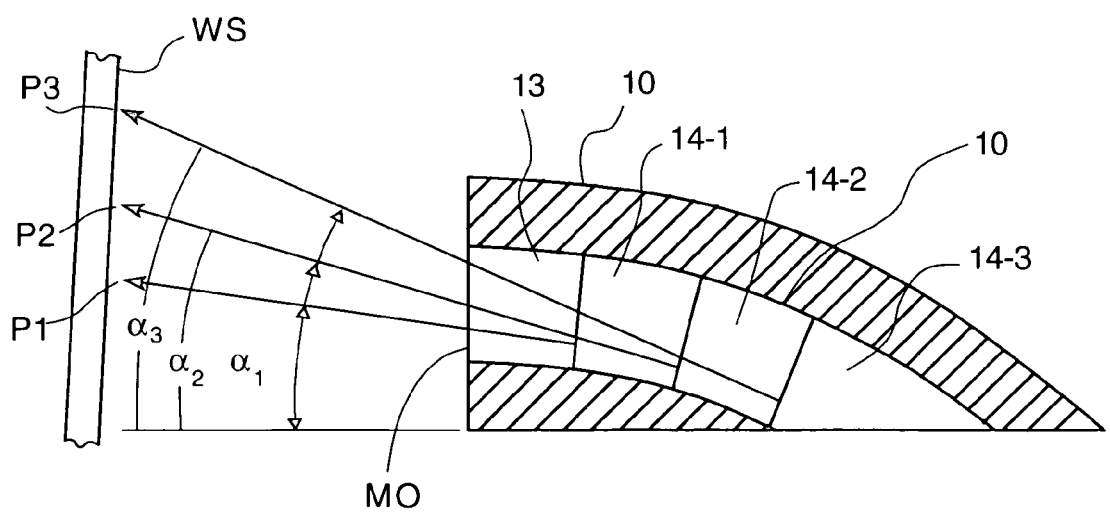
FIG. 5 is a sectional view of a curved slot and diagrammatically illustrating the variation in aiming angles as a function of the depth of insertion of the nozzle insertion chip.

Referring now collectively to FIGS. 4–7, a fluidic housing 10 having an input barb 11 for attachment to a supply of wash fluid under pressure. In a particular embodiment, the wash fluid is a windshield washer fluid and the supply is a windshield washer fluid supply in a vehicle. The housing 10 has a fluidic insert slot 13 which is curved to receive a complementary curved insert or chip 14 which is force fitted into the slot 13. According to the invention, the overall length of the slot 13 is longer than the overall length of the insert 14. The curved fluidic insert 14, being shorter than the overall length of the housing slot 13, can be inserted at varying depths in slot 13 to vary the aim angle $\alpha$, $\alpha 1$, $\alpha 2$, $\alpha 3$, (FIG. 5) and the position of impingement p1, p2, p3, etc. on wash surface WS. In the illustrated embodiment, the closer the chip insert 14 is to the mouth MO of slot 13, the lower is the aim angle $\alpha$, and conversely, the deeper the chip insert 14 is in slot 13, the higher is the aim angle $\alpha$. By adjusting the curvature of the slot 13 and the fluidic insert 14, the amount of variation possible and sensitivity to insertion depth can be controlled. By more curvature, the aim angle can be adjusted more but is more sensitive to insertion depth tolerance. With less curvature, insertion depth is more robust but the aim adjustment range is smaller. Thus, both the curvature as well as the depth of insertion are adjustment parameters, one or both of which may be adjusted to vary the aim angle. Change in insert depth results in depth change of fluid exit angle for a given a curved slot. The finish depth of the insert assembly is varied to change the fluid exit angle. Spring fingers SF lock housing 10 in a fixed position and are conventional.

Figure 6:
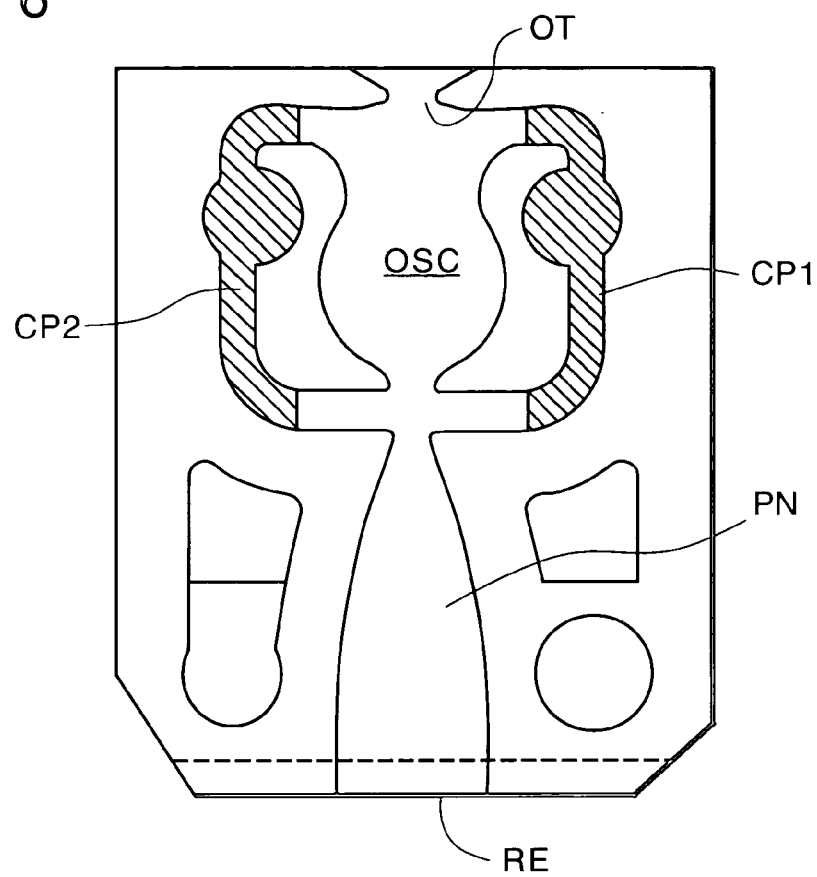
FIG. 6 is a plan view of washer nozzle silhouette incorporating the invention.
Figure 7:
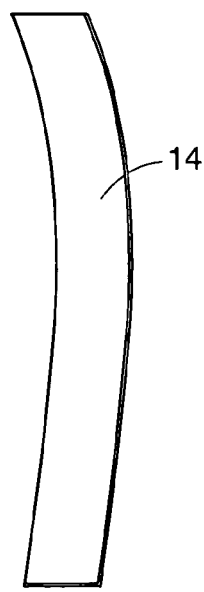
FIG. 7 is a side elevational view of the fluidic nozzle insert shown in FIG. 6.

FIG. 6 is one example of a fluidic oscillator useful in practicing the invention. This oscillator is of the type disclosed in Stouffer U.S. Pat. No. 4,508,267, entitled, "Liquid Oscillator Device". In this type of fluidic oscillator, the power nozzle PN is open at the end RE to receive the wash fluid flowing in the feed 12. In this embodiment, the wash fluid projects a jet through the power nozzle towards the outlet through OT and due to the construction of the oscillation chamber OSC, a system of oscillation vortices is induced, which, in conjunction with control passages CP1, CP2, causes the jet of fluid to oscillate or sweep back and forth through the outlet OT. For a fuller explanation of the operation, please refer to the aforementioned Stouffer patent.

Figure 8:
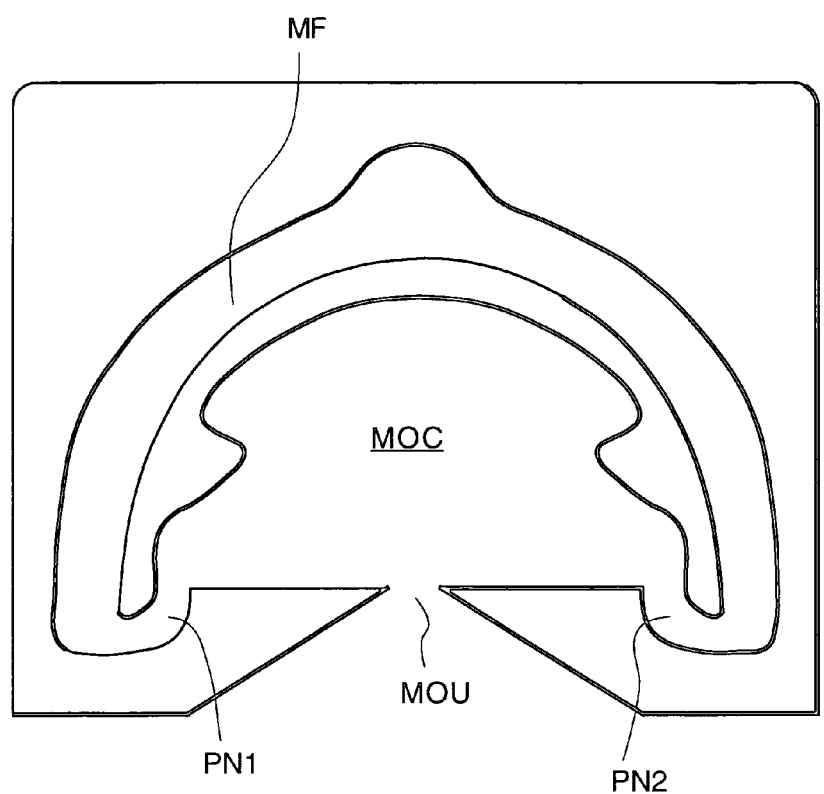
FIG. 8 is a plan view of a further washer nozzle silhouette incorporating the invention.

In the embodiment shown in FIG. 8, a multiple power nozzle type fluidic oscillator is disclosed and is of the type disclosed in Ragu U.S. Pat. No. 6,253,782, entitled, "Feedback-Free Fluidic Oscillator and Method". A manifold MF feeds wash liquid to power nozzles PN1, PN2 which project jets of wash liquid into oscillation chamber MOC which sets up a system of vortices resulting in a sweeping jet of wash fluid issuing through outlet MOU. It is apparent that many other types of fluidic oscillators may be utilized in practicing the invention and these are just two examples of those utilized in the art.

There has been disclosed a washer system in which a washer nozzle housing has a slot for receiving a nozzle insert for projecting a jet of wash fluid upon a surface from a relatively fixed position. The housing slot according to the invention is made longer than the nozzle insert and both are arcuately curved with the fluidic insert being finely curved. The amount of curvature and the depth of penetration of the insert into the nozzle housing slot is variable to vary the angle of impingement of the wash fluid on the wash surface. The aim angle can be adjusted by varying the depth of the insertion of the fluidic device in the curved slot and by adjusting the curvature of the fluidic slot, the amount of variation possible and the sensitivity to variation depth can be controlled. With more curvature, the aim angle can be adjusted more but is more sensitive to insertion depth tolerance. With less curvature, the insertion depth is more robust but the aim range is smaller.

To reiterate, the advantages of the invention are that it allows for aim adjustment after components are tooled without additional cost. One design can be utilized for many applications providing commonality and economy of scale. The invention permits the adjustments or movement in the field while retaining flexibility at the manufacturing site to adjust the aim. Finally, the invention provides pre-aimed that is more robust against manufacturing variation, thermal effects, vibration and impact during use than typical ball and socket type arrangement.

The invention also encompasses the method of adjusting the aim point of a washer system in which the washer nozzle housing is provided with an arcuate or curved slot for receiving a nozzle insert having a correspondingly curved cross section. By varying the degree of curvature, and/or the depth of the insertion of the insert into the slot, the aim angle is easily changed.

While the invention has been described in relation to preferred embodiments of the invention, it will be appreciated that other embodiments, adaptations and modifications of the invention will be apparent to those skilled in the art.

What is claimed is:

1. In washer systems in which a washer nozzle housing has a slot for receiving a nozzle insert for projecting a jet of wash fluid upon a surface from a relatively fixed position, the improvement wherein said housing slot is longer than said nozzle insert and said slot is curved and said nozzle insert is correspondingly curved, whereby the depth of insertion of said nozzle insert into said housing slot is varied to vary the angle of impingement of said wash fluid on said surface.

2. The washer system defined in claim 1 wherein said nozzle insert is a fluidic nozzle insert.

3. The washer system defined in claim 1 wherein said nozzle insert is a fluidic oscillator.

4. A method of adjusting the aim point of a washer system in which a washer nozzle housing has a slot for receiving a nozzle insert for projecting a jet of wash fluid upon a wash surface from a relatively fixed position, comprising forming said housing slot in a curved configuration that is longer than said nozzle insert and correspondingly curving said nozzle insert, whereby the depth of insertion of said nozzle insert into said housing slot varies the aim angle and angle of impingement of said wash fluid on a surface.

5. The method defined in claim 4 including the step of changing the degree of curvature of said slot.

6. The method defined in claim 4 wherein said nozzle insert is a fluidic oscillator and the projected jet is swept back and forth across said wash surface.

7. In washer systems in which a washer nozzle housing has a slot for receiving a nozzle insert for projecting a jet of wash fluid upon a surface from a relatively fixed position, the improvement wherein said slot is curved and said nozzle insert is correspondingly curved, whereby the depth of insertion of said nozzle insert into said housing slot is varied to vary the angle of impingement of said wash fluid on said surface.

8. The washer system defined in claim 7 wherein said nozzle insert is a fluidic nozzle insert.

9. The washer system defined in claim 7 wherein said nozzle insert is a fluidic oscillator.

10. A method of adjusting the aim point of a washer system in which a washer nozzle housing has a slot for receiving a nozzle insert for projecting a jet of wash fluid upon a wash surface from a relatively fixed position, comprising forming said housing slot in a curved configuration and correspondingly curving said nozzle insert, whereby the depth of insertion of said nozzle insert into said housing slot varies the aim point and angle of impingement of said wash fluid on a surface.

11. The method defined in claim 10 including the step of changing the degree of curvature of said slot.

12. The method defined in claim 10 wherein said nozzle insert is a fluidic oscillator and the projected jet is swept back and forth across said wash surface.

13. In washer systems having a washer nozzle housing, a fluidic nozzle insert, said washer nozzle housing having a slot for force fit receiving said nozzle insert for projecting a jet of wash fluid upon a surface from a relatively fixed position, the improvement wherein said slot is curved and said fluidic nozzle insert is correspondingly curved, whereby the depth of insertion of said fluidic nozzle insert into said housing slot is varied to vary the angle of impingement of said wash fluid on said surface.

14. The washer system defined in claim 13 wherein said nozzle housing is longer than said fluidic nozzle insert.

15. The washer defined in claim 13 wherein said fluidic nozzle insert is a fluidic oscillator.

* * * * *